June 8, 1965 R. E. HUDSON 3,187,584

DENSIMETER

Filed Sept. 18, 1961 3 Sheets-Sheet 1

INVENTOR.
Roy E. Hudson

BY C. W. Woffee Atty.

INVENTOR.

Ray E. Hudson

BY C. W. Coffee

Att'y.

June 8, 1965 R. E. HUDSON 3,187,584

DENSIMETER

Filed Sept. 18, 1961 3 Sheets-Sheet 3

INVENTOR.

Ray E. Hudson

BY C. W. [signature] Att'y.

United States Patent Office 3,187,584
Patented June 8, 1965

1

2

3,187,584
DENSIMETER

Ray E. Hudson, % The Bell Corporation,
P.O. Box 849, Odessa, Tex.
Filed Sept. 18, 1961, Ser. No. 138,689
9 Claims. (Cl. 73—434)

This invention relates to apparatus for measuring the density of fluids and more particularly to a densimeter adapted to continuously measure the density of a fluid as it flows through the measuring instrument.

An object of this invention is to provide a densimeter which accurately measures the density of fluids as the fluids flow through the densimeter.

Another object of this invention is to provide such a densimeter wherein the measurement of the density of the fluid is reflected by a signal which may be used to operate a recorder or controller whereby a constant record of the density may be kept or whereby adjustments may be made to adjust process flow mixtures and thereby make the density correspond to a set value.

Another object is to make such a densimeter wherein the sensitivity and the range are adjustable easily and independently.

Further object is to make such a densimeter which is sensitive yet rugged.

A further object is to make such a densimeter wherein it is not adversely affected by stresses upon the mounting bracket or case.

Still further objects are to achieve the above with a device that is sturdy, compact, durable, simple, and reliable yet inexpensive and easy to manufacture.

The specific nature of the invention as well as other objects, uses, and advantages thereof will clearly appear from the following description and from the accompanying drawings, the different views of which are not necessarily to the same scale, in which.

Figure 1:
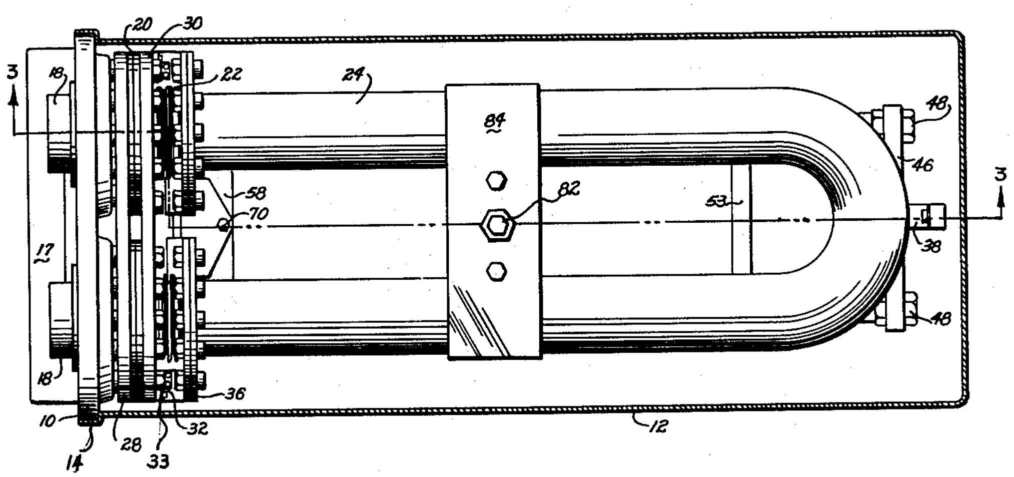
FIG. 1 is a top view of a densimeter according to this invention with the cover in section.

As may be seen in the accompanying drawings, the device is structurally constructed upon mounting plate 10 which is disc shaped.

Cylindrical cover 12 is attached to the plate 10. The cover 12 is closed at one end or cup-shaped and has flange 14 on the opened end which slips over the mounting plate 10, secured thereto by any convenient means. The cover is vented to permit the escape of air from within the cover.

Bracket 16 is attached to the outside of the mounting plate 10. The bracket 16 is basically L-shaped with one leg which is adapted to be bolted or attached to a flat surface and upright leg 17 which is bolted by bosses or washers (not shown) to the mounting plate 10.

Figures 5, 6, 7:
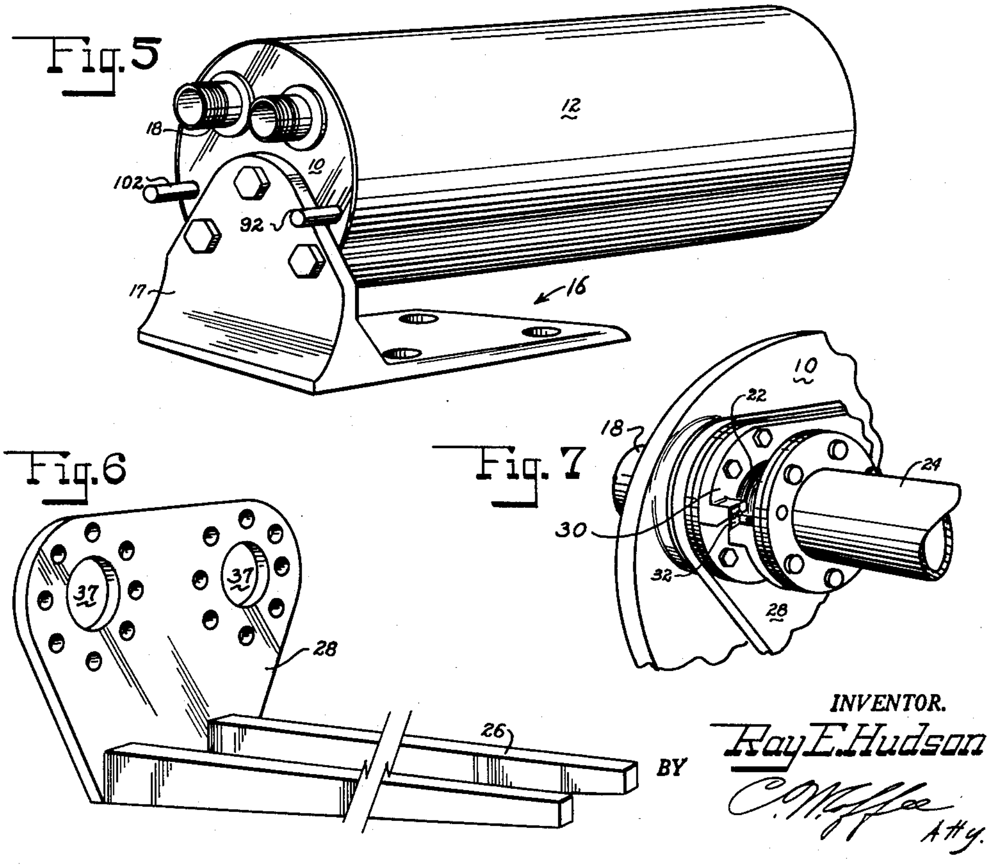
FIG. 5 is a perspective view of the densimeter of FIGS. 1–3 with the cover.
FIG. 6 is a perspective view of the flange ring and cantilever arms.
FIG. 7 is a partial perspective view showing the attachment of the U-tube to the mounting plate.

The mounting plate 10 has two apertures therethrough. A nipple 18 extends through each aperture. Outside of plate 10, the nipples 18 may be threaded if desired as seen in FIG. 5. Each nipple 18 terminates on the inside of the mounting plate 10 with flange 20. Bellows 22 (with flanges at each end) are connected to the flanges 20. U-tube 24 is flange connected to the bellows 22. The bellows are means for permitting slight relative movement of the U-tube to the mounting plate. The U-tube 24 has two horizontal legs which are parallel to each other.

Figure 2:
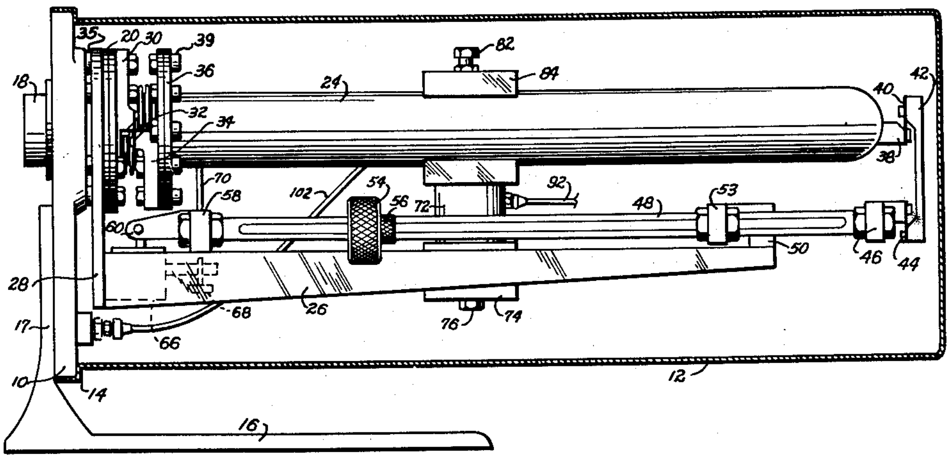
FIG. 2 is an elevational view of the densimeter with the cover in section.

A pair of support arms 26 support mechanism to weigh the U-tube. Basically, the support arms 26 are parallel to each other and parallel to each leg of the U-tube. Flange ring 28 is attached to the arms 26 which extend at right angles to make an L-shaped structure as seen in FIGS. 2 and 6.

Crescent shaped pivot bar 30 extends from one flange 20 to the other at the top thereof. It is called a pivot bar because it carries cross springs 32, which function as a pivot and indeed have been shown on the schematic view (FIG. 4) as a pivot. The other side of the cross springs 32 are connected to another crescent shaped pivot bar 34 which is in turn attached to flanges 36 which are a portion of the legs of the U-tube 24.

Bolts 33 extend through the flanges of the bellows 22, flange 20, ring 28, spacer washers 35, and thread into mounting plate 10. The upper bolts 33 also extend through the pivot bar 30. Thus the bolts 33 hold the pivot bar 30 and ring 28 in place and also hold the flange 20 and bellows flange in fluid tight relationship. The nipples 18 extend through holes 37 in the flange ring 20. Similar bolts 39 maintain the flange of the bellows 22 in fluid tight relationship with U-tube flange 36; and also maintain pivot bar 34 on the U-tube 24.

Thus, the U-tube 24 is mounted for movement about a horizontal axis near the open end of the legs of the U-tube 24. The cantilevered support arms 26 are attached to the mounting plate 10 at the same point that the U-tube is mounted and adjacent where the U-tube 24 is pivoted. Therefore, regardless of the amount of strain that may be placed upon the apparatus at the mounting bracket 16, this will not be reflected in the relationship of the support arms 26 and the U-tube 24. For example, suppose that the mounting bracket 16 was bolted quite tightly to an uneven surface until it assumed considerable bow therein. Yet, because the bracket 16 is only mounted to the mounting plate 10 by bosses or spacing washers similar to washers 35, this would not affect the relationship between the support arms 26 and the U-tube 24. This is because only slight stress or perhaps none would be transmitted to the mounting plate 10. Even though a certain amount of strain was transmitted to the mounting plate 10 because the U-tube 24 and the support arms 26 are attached to the same area on the mounting plate, any strain in the mounting plate 10 will not cause appreciable relative movement between these two parts.

Figure 3:
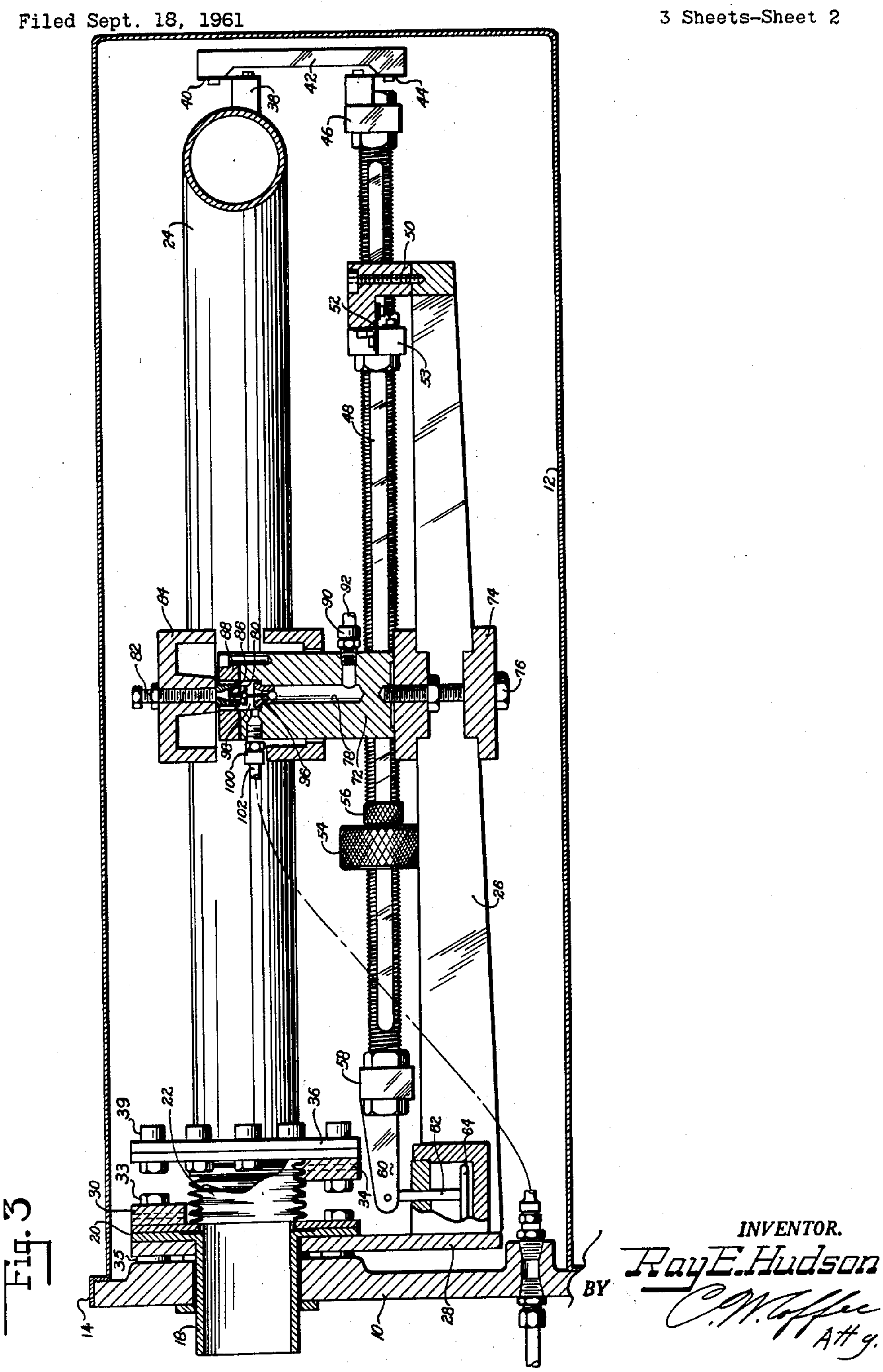
FIG. 3 is an axial sectional view taken on line 3—3 of FIG. 1.
Figure 4:
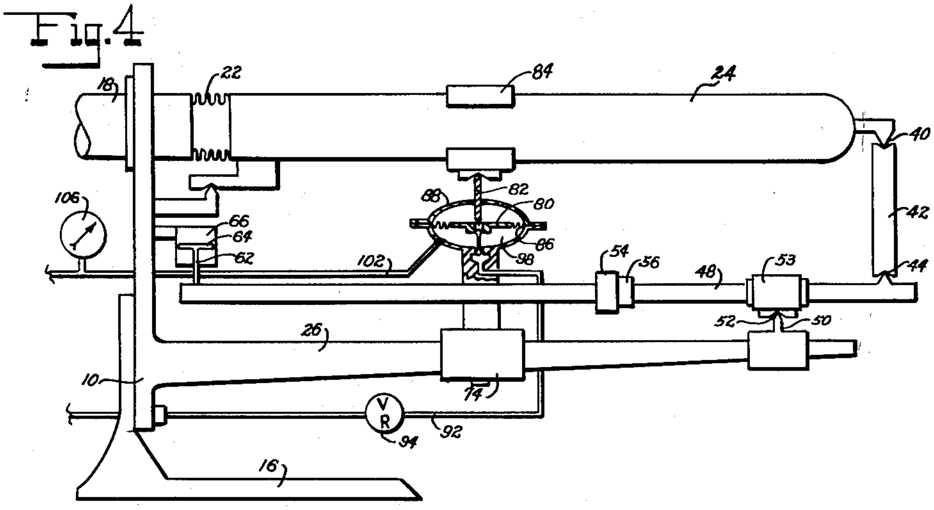
FIG. 4 is a schematic representation of a densimeter according to this invention with some modifications from that shown in FIGS. 1–3.

Thus, the arrangement of FIGS. 1–3 is preferred to that depicted in FIG. 4. If there were relative movement of the conduits connected to nipples 18 and the bracket 16, the strain in mounting plate 10 would cause relative movement of the tube 24 to the arms 26 in FIG. 4, whereas less or none would result in the design of FIGS. 1–3.

Strain in the mounting frame has been a source of trouble wherein support arms (similar to arms 26) were not cantilevered but in fact form a portion of the frame and are secured at each end to the separate portions of the mounting frame.

Spring block 38 is attached to the closed end of the U-tube 24. It carries pivot spring 40 which is attached on the other end to tension bar 42. The other end of the tension bar 42 carries pivot spring 44 which is attached to cross bar 46. Cross bar 46 connects two counter-balance rods 48. These rods 48 are parallel to each other and parallel to the legs of the U-table 24. As a matter of design the spacing between them is the same as the spacing between the U-tubes 24. The support arms 26 have less spacing between them so that the rods 48 are outside the support arms 26. The rods 48 are threaded their entire length.

Pivot block 50 is bolted to the ends of arms 26. Cross springs 52 are bolted between pivot block 50 and pivot tie bar 53 which interconnects the counterbalance rod 48 at that point. It is held securely in place by lock nuts on either side thereof as is the back tie bar 46.

Counterbalance weights 54 are threaded to the counterbalance rods 48 and are held securely in place by lock nut 56. One side of each counterbalance rod 48 is flat therefore adaptable to put indices thereon so that the exact position of the counterbalances 54 may be accurately determined.

The two counterbalance rods 48 are connected together by front tie bar 58 which is held in place by nuts on either side of it. Finger 60 extends from the front tie bar 58 and has dependently pivoted therefrom shaft 62. Piston 64, a portion of dashpot 66, is connected to the shaft 62. Therefore, it may be seen that any vibrations or oscillations in the system are dampened out by the dashpot 66 in a manner well known to the art.

Limit screw 68 extends from a mounting bracket on the dashpot 66, while limit screw 70 extends from a bracket crescent pivot bar 34. The movement of the system is limited as the limit screws terminate opposite from tie bar 58.

Pedestal 72 is clamped to the support arms 26 by clamp 74. The clamp 74 is a cross bar extending from one support arm to the other and adapted to be held in frictional engagement with the support arm by bolt 76. The pedestal 72 has bore 78 in the top thereof. Piston 80 operates within the bore 78. The piston 80 is actuated by piston screw 82 which is threaded through the upper portion of clamp 84 which extends around the parallel arm of the U-tube 24. The piston screw 82 is held in adjusted position by a lock nut. As will be explained later, there is very slight movement between the piston 80 and the bore 78; a seal is affected between them by constant area diaphragm 86, e.g., a BRD diaphragm manufactured by the Bellofram Corporation, which is connected to the piston 80 and clamped on the outside between cap 88 and the top of the pedestal 72. The bore 78 in the pedestal 72 has tubing connection 90 by which it is connected by tube 92 to a source of air pressure (not shown). Although the apparatus may tolerate certain fluctuations in air pressure, regulator valve 94 (FIG. 4) may be used to provide a constant pressure.

Valve inlet seat 96 is in the bore 78 just below that portion of the bore where the piston 80 operates. It is screwed within the bore 78. Therefore, a chamber 98 is formed immediately below the piston 80. Tubing connection 100 connects the chamber 98 to tube 102 which is ultimately connected through the mounting plate 10 to a recording instrument (not shown). It will be the pressure within the tube 102 which reflects pressure in chamber 98 which indicates the density of the fluid flowing in the U-tube 24. The piston 80 has an aperture through it which connects a valve seat at the bottom of the piston 80 to atmosphere. A peanut valve operates in the space between the valve seat in the piston 80 and the inlet seat 96. The peanut valve consists of two spherical valves interconnected by a pilot plug. The spherical surface accommodates certain slight misalignment which occurs in operation. The aperture through the piston 80 vents the chamber 98 to the atmosphere unless it is closed by the upper valve of the peanut valve. The piston 80 exerts upward stress on the U-tube 24 through the piston screw 82.

*Operation*

The apparatus is connected so that the fluid, the density of which is to be determined, flows through the U-tube 24. Air under pressure is supplied to the tube 92 and gauge 106, regulator, and/or controller is connected to the signal tube 102. The cross springs are centered so that changes in pressure or flow of fluid do not change the reading on gauge 106. In this requirement the embodiment of FIG. 4 as schematically shown would be accurate for one pressure only as the pivot is below the axis of the U-tube.

A fluid of known density is passed through the U-tube 24 and the counterbalance weights 54 are adjusted on the counterbalance rods 48 until a corresponding reading is obtained upon the gauge 106. Thereafter, a fluid of unknown or varying density is passed through the U-tube 24. If the fluid is heavier than the standard fluid it will weigh more, tending to cause the U-tube 24 to move downward around the axis of the pivot springs 32. This downward movement will cause piston screw 82 to move the piston 80 downward which will move the bottom valve of the peanut valve from the inlet seat 96. This will permit additional air to flow from tube 92 into the chamber 98. The increased pressure will cause an increased force upward against the piston 80 which in turn will cause it to exert an additional force against the piston screw 82 which will tend to return it to its original position so that the bottom of the peanut valve again seats on inlet seat 96 ceasing the flow of air into the chamber 98. Therefore, the system will be balanced again. However, there will be an increased air pressure upon the signal tube 102 and correspondingly there will be a higher reading upon the gauge 106.

If a controller is attached to this, the increased pressure will be transmitted to the controller. This will make whatever corrections necessary to reduce the density of the fluid in U-tube 24 thus causing the U-tube 24 to become lighter. Then the pressure in the chamber 98 pushes the piston 80 upward. This upward movement of the piston 80 will remove the peanut valve from the seat of the aperture through the piston allowing the air to escape from the chamber 98 and as the cover 12 is vented, it escapes therefrom also. As air escapes pressure will become less and therefore, the piston will move downward until it again seats upon the top of the peanut valve. The system again returns to an equilibrium position. However, now there is less pressure in the chamber 98 and within tube 102 so that the gauge 106 has a reading corresponding to the density of the fluid in the U-tube 24.

If the sensitivity of the reading is to be increased, the clamps 74 and 84 may be loosened and moved closer to the axis of pivot springs 32. Then a greater pressure change in chamber 98 will be needed to balance the system for a slight change in density of fluid within U-tube 24. Each time the sensitivity is adjusted by moving the position of piston 72, it will be necessary to adjust the zero point by changing the counterbalances 54.

Although the adjustment is not quickly made, the sensitivity of the instrument is affected by the diameter of the piston 80. I.e., the smaller the piston 80, the greater the sensitivity of the device.

The device actually is a weighing device to determine the weight of the fluid within U-tubes 24. Since the tubes are of constant volume the weight of the fluid within the U-tubes 24 will be directly proportional to the density of the fluid. It will be noted that all the operative portions of the device are connected either to the U-tube 24 or the cantilevered arms 26. Also it will be noted that these two elements are connected to the mounting plate 10 at the same area. Therefore, regardless of the strain which is introduced into the mounting bracket 16 or transmitted from the cover 12 will not cause a strain upon the support arms 26 which would affect the accuracy.

The peanut valve might be considered a means for determining the relative movement of the U-tube 24 to the support arms 26, and the piston 80 and air system might be considered a means responsive to relative movement to again balance this relationship. It will be noted that this system for maintaining the balance and relative position between the U-tube 24 and the support arms 26 is connected directly from the U-tube 24 to the support arm 26. It is not directly dependent upon the position or movement of the counterbalance rods 48. Any lost motion or friction which may occur in the pivot springs (although this has been reduced to as near minimum as possible) does not directly affect the results. I have found that a more sensitive instrument results if the balance is made directly from the U-tube 24 to the support arms 26 rather than between the counterbalance rods 48 and support arms 26.

Thus it may be seen I have provided a simple densimeter. If a temperature correction is desired to relate the density measured to density at standard temperature, this may be achieved by producing an air pressure related to the temperature and adding that pressure to the pressure on line 102. Such devices are within the skill of those skilled in the art.

It will be apparent that the embodiments shown are only exemplary and that various modifications can be made in construction, materials, and arrangement within the scope of the invention as defined in the appended claims.

I claim as my invention:

1. In a densimeter having a U-tube, said U-tube having two parallel legs, the ends of the legs being open thus providing means for circulating therethrough fluid the density of which is to be determined, a mounting plate, said U-tube pivoted to said mounting plate at about the ends of the legs which are adjacent to each other, and means for determining the weight of the U-tube and contents; the improvement comprising: at least one arm cantilevered from said mounting plate, said means for determining the weight interconnecting the cantilevered arm and U-tube, a pedestal interconnecting the arm and U-tube, the pedestal exerting force therebetween, means for determining change in position of the U-tube relative to the arm, means for changing the force exerted by the pedestal responsive to the change of position of the U-tube relative to the arm, and means for measuring the force exerted by the pedestal.

2. In a densimeter having a U-tube, said U-tube having two parallel legs, the ends of the legs being open thus providing means for circulating therethrough fluid the density of which is to be determined, a mounting plate, said U-tube pivoted to said mounting plate at about the ends of the legs which are adjacent to each other, and means for determining the weight of the U-tube and contents; the improvement comprising: two arms cantilevered from said mounting plate, the arms generally parallel to said U-tube, said means for determining the weight being clamped to said U-tube for longitudinal adjustment along said U-tube, and also being clamped to said arms for corresponding longitudinal adjustment along said arms.

3. The invention as defined in claim 2 wherein the means for determining the weight of the U-tube includes a pedestal interconnecting the arms and U-tube, the pedestal exerting force therebetween, means for determining change in position of the U-tube relative to the arms, means for changing the force exerted by the pedestal responsive to the change of position of the U-tube relative to the arms, and means for measuring the force exerted by the pedestal.

4. In a densimeter having a U-tube, said U-tube having two parallel legs, the ends of the legs being open thus providing means for circulating therethrough fluid the density of which is to be determined, a mounting plate, said U-tube pivoted to said mounting plate at about the ends of the legs which are adjacent to each other, and means for determining the weight of the U-tube and contents; the improvement comprising: said means for determining the weight being a pedestal attached to elements attached to the mounting plate; the pedestal having a bore therein; the bottom of the bore adapted to be connected to a source of air pressure; a clamp secured to the arms of the U-tube, a piston attached to the clamp within the bore, a flexible, fluid tight connection between the piston and pedestal, the piston having a hole therethrough vented to the atmosphere; a valve seat in the pedestal bore thus forming a chamber between the valve seat and piston; means for determining the air pressure in said chamber; two valves interconnected by a pilot plug, one of the valves seated below the hole in the piston, the second of the valves seated below the valve seat in the pedestal bore; so arranged and constructed that if the U-tube, clamp and piston move downward that the second of the valves is moved from the valve seat allowing more air to enter the chamber, thus increasing the pressure in the chamber and the force on the U-tube; and that if the U-tube, clamp and piston move upward that the piston moves away from the first valve allowing air to escape from the chamber, thus decreasing the pressure in the chamber and the force on the U-tube.

5. In a densimeter having a U-tube, said U-tube having two parallel legs, the ends of the legs being open thus providing means for circulating therethrough fluid the density of which is to be determined, and a mounting plate, said U-tube pivoted to said mounting plate at about the ends of the legs which are adjacent to each other; the improvement comprising: two flanged nipples, a flange ring between the nipple flange and said mounting plate, bolts extending from each nipple flange through the flange ring into said mounting plate, two arms cantilevered from the flange ring, fluid coupling means for permitting slight relative movement interconnecting each nipple and said open end of a leg of the U-tube, and means for determining the weight of the U-tube and contents attached to the cantilevered arms; said means for determining the weight including a pedestal having a bore therein; the bottom of the bore adapted to be connected to a source of air pressure; a clamp secured to the arms of the U-tube, a piston attached to the clamp within the bore, a flexible, fluid tight connection between the piston and pedestal, the piston having a hole therethrough vented to the atmosphere; a valve seat in the pedestal bore thus forming a chamber between the valve seat and piston; means for determining the air pressure in said chamber; two valves interconnected by a pilot plug, one of the valves seated below the hole in the piston, the second of the valves seated below the valve seat in the pedestal bore; so arranged and constructed that if the U-tube, clamp and piston move downward that the second of the valves is moved from the valve seat allowing more air to enter the chamber, thus increasing the pressure in the chamber and the force on the U-tube; and that if the U-tube, clamp and piston move upward that the piston moves away from the first valve allowing air to escape from the chamber, thus decreasing the pressure in the chamber and the force on the U-tube.

6. In a densimeter having a U-tube, said U-tube having two parallel legs, the ends of the legs being open thus providing means for circulating therethrough fluid the density of which is to be determined, and a mounting plate, said U-tube pivoted to said mounting plate at about the ends of the legs which are adjacent to each other; the improvement comprising: two flanged nipples, a flange ring between the nipple flange and said mounting plate, bolts extending from each nipple flange through the flange ring into said mounting plate, two arms cantilevered from the flange ring, fluid coupling means for permitting slight relative movement interconnecting each nipple and said open end of a leg of the U-tube, and means for determining the weight of the U-tube and contents attached to the cantilevered arms.

7. The invention as defined in claim 6 wherein said means for determining the weight is interconnected between the cantilevered arms and the legs of the U-tubes.

8. The invention as defined in claim 6 wherein means for partially counterbalancing the weight of the U-tube and contents is interconnected between the cantilevered arms and the legs of the U-tubes.

9. The invention as defined in claim 8 wherein said means for determining the weight is interconnected between the cantilevered arms and the legs of the U-tubes.

References Cited by the Examiner

UNITED STATES PATENTS 3,044,302 7/62 Knauth ---------------- 73—434

FOREIGN PATENTS 776,926 6/57 Great Britain.
1,166,059 6/58 France.
1,196,449 5/59 France.

RICHARD C. QUEISSER, *Primary Examiner.*

DAVID SCHONBERG, JOSEPH P. STRIZAK, *Examiners.*